United States Patent
Li et al.

(10) Patent No.: US 11,673,520 B2
(45) Date of Patent: Jun. 13, 2023

(54) METHOD, DEVICE AND SYSTEM FOR AUTOMATICALLY ADJUSTING DRIVER-RELATED IN-VEHICLE EQUIPMENT

(71) Applicant: Volvo Car Corporation, Gothenburg (SE)

(72) Inventors: Wei Li, Shanghai (CN); Zujie Fan, Shanghai (CN); Yan Li, Shanghai (CN); Youming Xu, Shanghai (CN); Xiangyu Zhang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 189 days.

(21) Appl. No.: 17/189,375

(22) Filed: Mar. 2, 2021

(65) Prior Publication Data

US 2021/0276501 A1    Sep. 9, 2021

(30) Foreign Application Priority Data

Mar. 3, 2020   (CN) .......................... 202010138301.6

(51) Int. Cl.
 *B60R 16/037*    (2006.01)
 *G06T 7/521*     (2017.01)
 (Continued)

(52) U.S. Cl.
 CPC .......... *B60R 16/037* (2013.01); *B60N 2/0252* (2013.01); *G06T 7/521* (2017.01);
 (Continued)

(58) Field of Classification Search
 CPC ... B60R 25/24; B60R 25/2018; B60R 25/305; B60R 2325/205; B60R 25/01;
 (Continued)

(56) References Cited

U.S. PATENT DOCUMENTS

2013/0013157 A1*  1/2013  Kim ..................... B60R 16/037
                                                          701/49
2016/0368509 A1   12/2016  Uppal
(Continued)

FOREIGN PATENT DOCUMENTS

CN    110843614 A  *  2/2020  ............ B60N 2/002
CN    110843614 A     2/2020
(Continued)

OTHER PUBLICATIONS

Jul. 9, 2021 European Search Report issued on International Application No. 21160207.

*Primary Examiner* — Maceeh Anwari
*Assistant Examiner* — Aarron E Santos
(74) *Attorney, Agent, or Firm* — Clements Bernard Walker; Christopher L. Bernard

(57) ABSTRACT

A method, device and system for a method, device, and system for automatically adjusting driver-related in-vehicle equipment, the method including the steps of: acquiring a driver's height from a detection device of a vehicle; determining preset values of additional body parameters of the driver based on the driver's height and calculating a position for entry using the driver's height and the preset values of the additional body parameters of the driver; and adjusting the equipment including a driver's seat to the position for entry so as to facilitate the driver to enter the vehicle and sit on the seat.

14 Claims, 4 Drawing Sheets

(51) Int. Cl.
*B60N 2/02* (2006.01)
*G06T 7/60* (2017.01)

(52) U.S. Cl.
CPC ........ *G06T 7/60* (2013.01); *B60N 2002/0256* (2013.01); *B60N 2002/0268* (2013.01)

(58) Field of Classification Search
CPC . B60R 25/10; B60R 25/2045; B60R 25/2054; B60R 25/241; B60R 25/243; B60R 25/246; B60R 25/257; B60R 25/31; G06T 15/00; G06T 19/006; B60N 2/002; B60N 2/01; B60N 2/0224; B60N 2/0248; B60N 2/0252; B60N 2/06; B60N 2/14; B60N 2/986; B60N 2002/0256; B60N 2002/0268; B60N 3/001; B60N 3/002
See application file for complete search history.

(56) References Cited

U.S. PATENT DOCUMENTS

2018/0251085 A1   9/2018   Coburn et al.
2019/0016235 A1   1/2019   Parida et al.

FOREIGN PATENT DOCUMENTS

| DE | 102007046270 A1 * | 4/2009 | ........... B60R 16/037 |
|---|---|---|---|
| DE | 102007046270 A1 | 4/2009 | |
| DE | 102016013894 A1 | 5/2017 | |
| KR | 20040079700 A | 9/2004 | |
| WO | 20120028677 A1 | 3/2012 | |
| WO | 2019182604 A1 | 9/2019 | |
| WO | WO-2019182604 A1 * | 9/2019 | |

* cited by examiner

METHOD, DEVICE AND SYSTEM FOR AUTOMATICALLY ADJUSTING DRIVER-RELATED IN-VEHICLE EQUIPMENT

CROSS-REFERENCE TO RELATED APPLICATION

This disclosure claims the benefit of priority of co-pending Chinese Patent Application No. 202010138301.6, filed on Mar. 3, 2020, which is hereby incorporated by reference in its entirety.

TECHNICAL FIELD

The present disclosure relates to the field of vehicle technology, and more specifically, to a method, device and system for automatically adjusting driver-related in-vehicle equipment.

BACKGROUND

The fast development of vehicle-sharing services has made it possible for multiple drivers to share the same vehicle (such as a car) in our daily life. Due to the differences in body sizes and shapes, and driving habits of the multiple drivers, it is necessary to adjust driver-related in-vehicle equipment (such as a seat, a steering wheel, and rearview mirrors) relative to the vehicle accordingly so as to meet driving safety requirements and make driving experience more personal and satisfactory. As a matter of fact, individual drivers often need a few minutes to manually adjust positions of the seat and the steering wheel if they are driving the vehicle for the first time. When changing vehicles, a driver may even forget to adjust angles of the rearview mirrors relative to the vehicle. Thus, a potential safety hazard exists when a vehicle is driven by different drivers, and driving comfortableness is also reduced, and driving with the in-vehicle equipment being set in wrong positions would give rise to an increased degree of fatigue. Further, existing methods for automatically adjusting driver-related in-vehicle equipment are often performed after a driver sits on the seat, which do not take into consideration whether the driver can easily enter the vehicle and how long it would take the driver to adjust the relevant equipment.

SUMMARY

The present disclosure is directed to provide a method, device and system for automatically adjusting driver-related in-vehicle equipment so as to allow a driver to drive a vehicle in a safe and comfortable manner.

To this end, in one aspect of the present disclosure, there is provided the method for automatically adjusting driver-related in-vehicle equipment, the method including the steps of: acquiring a driver's height from a detection device of a vehicle; determining preset values of additional body parameters of the driver based on the driver's height and calculating a position for entry using the driver's height and the preset values of the additional body parameters of the driver; and adjusting the equipment including a driver's seat to the position for entry so as to facilitate the driver to enter the vehicle and sit on the seat.

Optionally, the step of acquiring a driver's height from a detection device of a vehicle includes the steps of: acquiring a first 3D depth image of the driver from a first camera of the detection device; and determining the driver's height based on the first 3D depth image.

Optionally, the driver's height can be acquired by determining an upper body height of the driver that exceeds the first camera's height based on the first 3D depth image and summing the upper body height of the driver and the first camera's height.

Optionally, each of the preset values of the additional body parameters of the driver is determined by multiplying the driver's height with a corresponding first proportionality factor, wherein each corresponding first proportionality factor is derived from a corresponding second proportionality factor that is determined based on ergonomic data.

Optionally, each corresponding first proportionality factor is set to be greater than the corresponding second proportionality factor.

Optionally, the method further includes the steps of: acquiring updated values of the additional body parameters of the driver from the detection device of the vehicle and calculating a position for driving using the driver's height and the updated values of the additional body parameters of the driver; and adjusting the seat from the position for entry to the position for driving so as to optimize the driver's driving posture sitting on the seat.

Optionally, the step of acquiring updated values of the additional body parameters of the driver from the detection device of the vehicle includes the steps of: acquiring a second 3D depth image of the driver sitting on the seat by a second camera of the detection device, and determining the updated values of the additional body parameters of the driver based on the second 3D depth image.

Optionally, the position for entry is configured to be lower than and backward relative to the position for driving.

Optionally, each of the preset values of the additional body parameters of the driver is greater than the corresponding updated value of the additional body parameters of the driver.

Optionally, the additional body parameters of the driver includes at least one of the driver's torso length and the driver's head length.

Optionally, the position for entry and the position for driving are determined via a same calculation procedure.

Optionally, the calculation procedure includes using a formula as below:

$$h' = \begin{cases} h' = A \times h_{driver} - l_{upper} \times \cos\theta' - l_{head} + B, \text{ others} \\ s_0 - l_{upper} \times \cos\theta' - l_{head}, \text{ when } h' < s_0 - l_{upper} \times \cos\theta' - l_{head} \\ l_0 - m_0 - l_{upper} \times \cos\theta' - l_{head}, \text{ when } h' > l_0 - m_0 - l_{upper} \times \cos\theta' - l_{head} \end{cases}$$

where h' represents a height from an intersection point of a seat cushion and a backrest to a floor of the vehicle, A and B represent numerical constants, $h_{driver}$ represents the driver's height, $l_{upper}$ represents the driver's torso length, and $l_{head}$ represents the driver's head length, $\theta'$ represents an angle of the backrest relative to a vertical direction, $s_0$ represents a height from the driver's eyes to the floor which allows a visual field of the driver to meet safety requirements, $m_0$ represents a safety height from the top of the driver's head to a roof of the vehicle which is required for preventing the driver's head from colliding with the roof in normal driving, $l_0$ represents a height from the roof to the floor; optionally, A and B are obtained by performing regression analysis of data from experimentation and design experience.

Optionally, the calculation procedure includes using a formula as below:

$$s'=\sqrt{k_1^2+k_2^2-2k_1\times k_2\cos\beta-(h'-h_0)^2}$$

where s' represents a horizontal distance from the intersection point of the seat cushion and the backrest to a brake pedal of the vehicle, $k_1$ represents the driver's thigh length, $k_2$ represents the driver's calf length, $\beta$ represents an angle of the driver's thigh relative to the driver's calf, and $h_0$ represents a height from the brake pedal to the floor when the brake pedal is not pressed.

Optionally the calculation procedure includes using a formula as below:

$$\gamma' = \arcsin\frac{k_2^2 - k_1^2 - s'^2 - (h'-h_0)^2}{2k_1\times\sqrt{(h'-h_0)^2+s'^2}} + \arctan\frac{s'}{h'-h_0}$$

where $\gamma'$ represents an angle of the seat cushion relative to a horizontal direction.

Optionally, the calculation procedure includes using a formula as below:

$$\varphi' = \arcsin\left[\frac{(L_0-l_{upper})\times\sin\theta' - \frac{1}{2}d_0}{l_{head}-(L_0-l_{upper})\times\cos\theta'}\right]+\theta'$$

where $\varphi'$ represents an angle of a headrest of the seat relative to the backrest, $L_0$ represents the backrest's length, $l_{upper}$ represents the driver's torso length, $l_{head}$ represents the driver's head length, $\theta'$ represents the angle of the backrest relative to the vertical direction, and $d_0$ represents a horizontal safety distance from the driver's head to the headrest.

Optionally, the equipment further includes a steering wheel and the method further includes the steps of: calculating a steering position of the steering wheel using the driver's height and the updated values of the additional body parameters of the driver; and adjusting the steering wheel to the steering position so as to optimize the driver's arm posture for steering the steering wheel; optionally, at least one of two formulas as below is used in the step of calculating the steering position of the steering wheel:

$$x' = \begin{cases} s' + l_{upper}\times\sin\theta' - a_1\times\sin(\delta+\theta') - a_2\times\sin(\alpha-\delta-\theta'), \text{ others} \\ s' + l_{upper}\times\sin\theta' - x_0, \text{ when } x' > s' + l_{upper}\times\sin\theta' - x_0 \end{cases}$$ and $$y' = h' + l_{upper}\times\cos\theta' + a_2\times\cos(\alpha-\delta-\theta') - a_1\times\cos(\delta+\theta')$$

where x' represents a distance from a center of the steering wheel to a brake pedal of the vehicle, y' represents a height from the center of the steering wheel to a floor of the vehicle, s' represents a horizontal distance from an intersection point of a seat cushion and a backrest of the vehicle to the brake pedal, $L_{upper}$ represents the driver's torso length, $\theta'$ represents an angle of the backrest relative to a vertical direction, $a_1$ represents the driver's upper arm length, $a_2$ represents the driver's forearm length, $\delta$ represents an angle of the driver's upper arm relative to the driver's torso, $\alpha$ represents an angle of the driver's upper arm relative to the driver's forearm, and h' represents a height from the intersection point of the seat cushion and the backrest to the floor.

Optionally, the equipment further includes a rearview mirror and the method further includes the steps of: acquiring positions of the driver's eyes from the detection device of the vehicle; determining an optimized angle of the rearview mirror based on the positions of the driver's eyes; and adjusting the rearview mirror to the optimized angle so as to optimize the driver's visual field for viewing surroundings around the vehicle.

In another aspect of the present disclosure, there is provided an adjustment device for automatically adjusting driver-related in-vehicle equipment, the adjustment device including: a processor; and a memory configured to store executable instructions that, when executed by the processor, cause the processor to perform the method.

In yet another aspect of the present disclosure, there is provided a system for automatically adjusting driver-related in-vehicle equipment, the system including: an adjustment device; and a detection device configured to acquire at least one of the driver's height, the preset values of the additional body parameters of the driver, and the updated values of the additional body parameters of the driver.

Optionally, the detection device includes: a first camera disposed outside the vehicle and configured to capture a first 3D depth image of the driver situated outside the vehicle and send the same to the adjustment device; and a second camera disposed within the vehicle and configured to capture a second 3D depth image of the driver sitting on the seat and send the same to the adjustment device.

In the present disclosure, the method, device and system are provided to adjust the seat to the position for entry in which it is easier for the driver to enter the vehicle and sit on the seat and to adjust the equipment simply and quickly to the position for driving in which the driver can drive the vehicle in a safe and comfortable manner. For example, the system includes the camera(s) disposed at the vehicle, such that the driver's height and optionally the values of the additional body parameters of the driver can be acquired from the camera(s) immediately before the driver is going to enter the vehicle and when the driver is sitting on the seat, the seat and optionally other of the equipment can be adjusted based on the acquired values twice accordingly. This can improve the accuracy of adjustment. Prior to the driver entering the vehicle, the equipment (mainly the seat) can be pre-adjusted, thereby shortening the time required for adjusting the equipment.

Further features of the present disclosure and advantages thereof are provided in the following detailed description of exemplary embodiments according to the present disclosure with reference to the attached drawings.

BRIEF DESCRIPTION OF THE DRAWINGS

The attached drawings, which are incorporated in and constitute a part of the specification, illustrate embodiments of the present disclosure and, together with the description thereof, serve to explain the principles of the present disclosure.

DETAILED DESCRIPTION OF EMBODIMENTS

Figure 1:
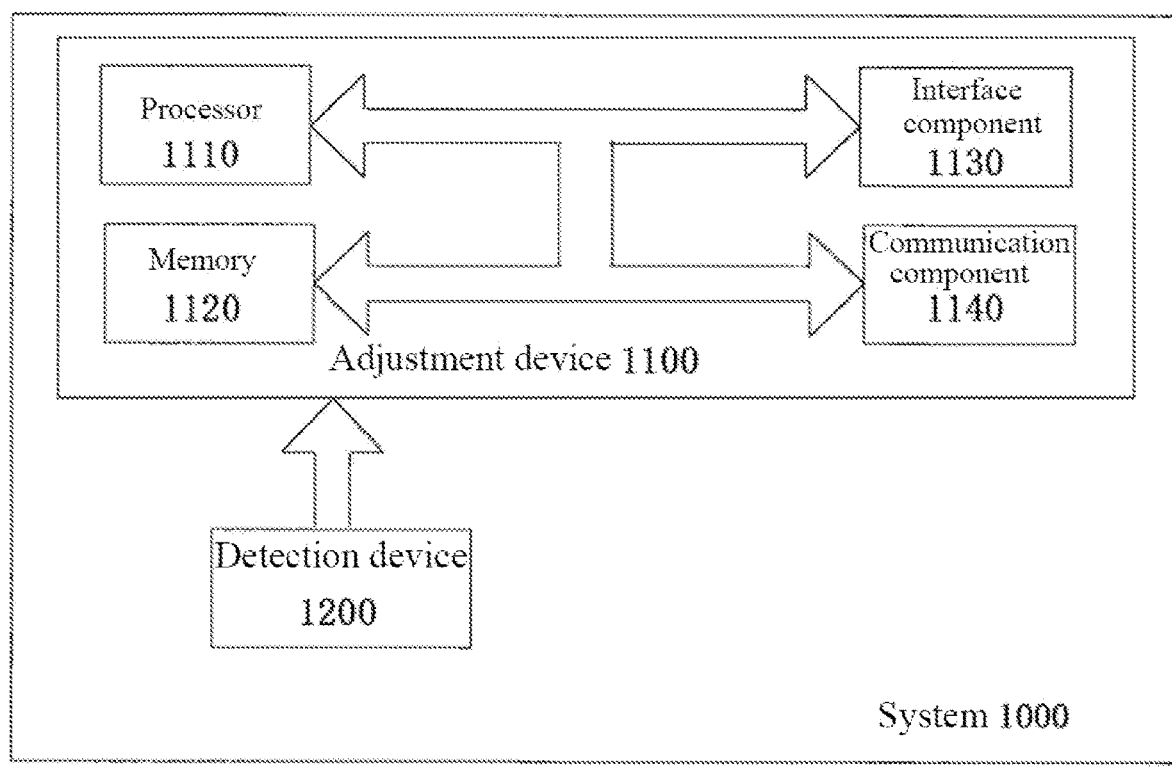
FIG. 1 is a block diagram of a system for automatically adjusting driver-related in-vehicle equipment according to an embodiment of the present disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the present disclosure, its application, or uses.

Techniques, methods and apparatus as known by one of ordinary skill in the relevant art may not be discussed in detail but are intended to be part of the specification where appropriate.

Notice that similar reference numerals and letters refer to similar items in the following figures, and thus once an item is defined in one figure, it is possible that it need not be further discussed for following figures.

FIG. 1 is a block diagram of a system for automatically adjusting driver-related in-vehicle equipment 1000 according to an embodiment of the present disclosure.

Generally, the equipment can include a seat, a steering wheel, rearview mirrors, and the like. Driving safety and comfort is affected by the in-vehicle equipment positioned and angled relative to the vehicle. Various flexibly adjustable parameters of the equipment are provided and are described in detail below. For example, the equipment can be adjusted based on coordinates created using the parameters. Further, the vehicle can be a car, a truck, a bus, and the like. Still further, the type of the car may vary for different users. However, the system 1000 of the present disclosure can be adapted for different types of vehicles. The system 1000 mainly includes an adjustment device 1100 and a detection device 1200 both for automatically adjusting the driver-related in-vehicle equipment.

The adjustment device 1100 can be configured as a vehicle-mounted computing device, including a processor 1110, memory 1120, an interface component 1130, and/or a communication component 1140, and the like. The processor 1110 can be a central processing unit (CPU), a microprocessor MCU, and the like. The memory 1120 includes, for example, ROM (Read Only Memory), RAM (Random Access Memory), nonvolatile memory such as a hard disk, and the like. The interface component 1130 includes, for example, a USB interface, a cable interface, and the like. The communication component 1140 can perform wired and/or wireless communication. Notice that the adjustment device 1100 in FIG. 1 is merely illustrative in nature and is in no way intended to limit the present disclosure, its application, or uses. In an embodiment of the present disclosure, the memory 1120 of the adjustment device 1100 is configured to store instructions which, when executed by the processor 1110, cause the processor 1110 to perform a method for automatically adjusting driver-related in-vehicle equipment provided by an embodiment of the present disclosure.

The detection device 1200 is configured to detect the driver's height and/or values of additional body parameters of the driver. In an embodiment of the present disclosure, the detection device 1200 can include a first camera 1210 and a second camera 1220. The first camera 1210 can be disposed outside the vehicle, such as at the exterior of a door frame, at the exterior of a window, on a side mirror, or at the exterior of a roof, and is configured to capture a first 3D (three-dimensional) depth image of the driver standing outside the vehicle and send the same to the adjustment device 1100. The second camera 1220 can be disposed within the vehicle, such as above a dashboard or on a windshield of the vehicle, and is configured to capture a second 3D depth image of the driver sitting on the seat and send the same to the adjustment device 1100.

Alternatively, the detection device 1200 can include a single camera provided at a suitable location of the vehicle. The single camera can capture the first 3D depth image before the driver enters the vehicle and capture the second 3D depth image when the driver is seated on the seat. The number, size(s), and location(s) of the camera(s) relative to the vehicle can vary in specific applications.

The detection device 1200 can include a ToF (time of flight) camera, a binocular camera, a structured light camera, or the like. Alternatively or additionally, the detection device 1200 can include a digital camera with an infrared sensor, an ultrasonic sensor, a pressure sensor, or the like. The detection device 1200 and the adjustment device 1100 communicate with each other in a wired and/or wireless manner.

In the case where the detection device 1200 includes the ToF camera, the ToF technology is utilized to capture a 3D depth image of a target scene as follows: each point of the target scene is illuminated by an actively modulated light beam or a light pulse from a light source (for example, a laser); then a reflected light beam from the target scene is a received by a receiver; and then a phase shift between the light pulse and the reflected light beam due to time-of-flight of light is measured by a processing circuit for determining 3D spatial information of each point of the target scene. Because the ToF camera can capture the 3D depth image of the target scene, when the driver is in the target scene, body parameters of the driver, such as the driver's height, the width of the driver's eyes, the driver's arm length, the driver's torso length, and the like can be determined by the adjustment device 1100 via the 3D depth image captured by the detection device 1200. It should be noted when certain body parameters of the driver cannot be directly determined from the target scene, for example, the detection device 1200 cannot capture or it is not necessary to capture the entire length of the driver's leg, the driver's height can be indirectly predicted by the adjustment device 1100 based on the height of the detection device 1200 relative to the vehicle.

In another embodiment, the detection device 1200 can be configured to acquire information of a physical or virtual key unique to the driver when the driver is opening a door of the vehicle or unlocking the vehicle and send the information to the adjustment device 1100 to confirm the identity of the driver. The adjustment device 1100 can retrieve the driver's height and/or the values of the additional body parameters of the driver stored in the memory 1120 that is/are corresponding to the identity of the driver. Alternatively, the detection device 1200 can request, based on the identity of the driver, to acquire the driver's height and/or the values of the additional body parameters of the driver from a third party, for example, a cloud server. In yet another embodiment, the detection device 1200 can be configured to, before the driver opens the door or unlocks the vehicle, acquire the driver's height and/or the values of the additional body parameters of the driver from a client (for example, a mobile phone, a laptop or a desktop computer) that communicates with the detection device 1200 directly or indirectly, in which case the driver's height and/or the values of the additional body parameters of the driver can be input by the driver to the client. The detection device 1200 can also detect directly or indirectly the driver's height and/or the values of the additional body parameters of the driver in different manners.

Those skilled in the art should understand that although the adjustment device 1100 is shown in FIG. 1 with multiple components, it is possible that the present disclosure can be achieved by using only some of the shown components. For example, only the processor 1110 and the memory 1120 can be included in adjustment device 1100. Further, those skilled in the art can design the instructions in accordance with the technical solutions disclosed in the present disclosure. Since how the instructions work, when executed by the processor is well known in the art, it will not be described in detail here.

Figure 2:
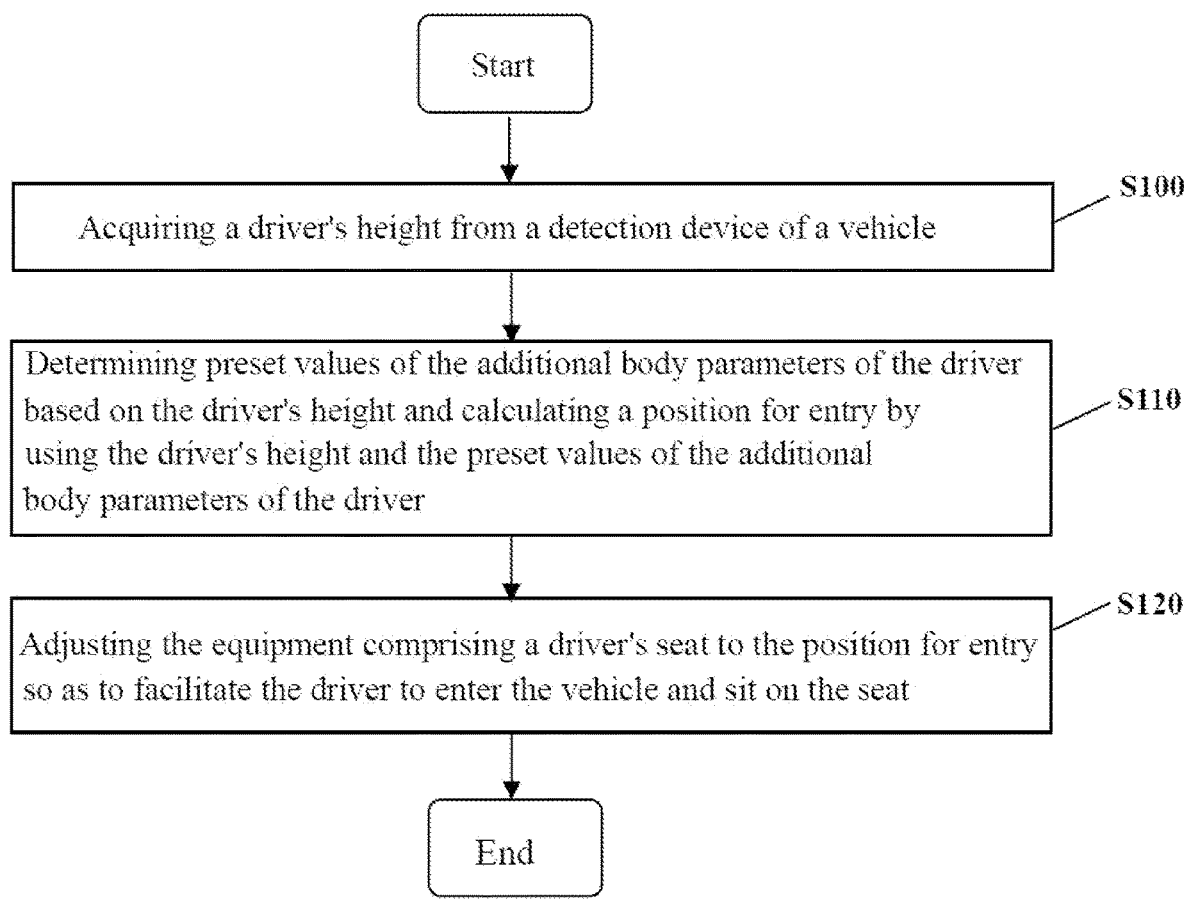
FIG. 2 is a flowchart of a method for automatically adjusting driver-related in-vehicle equipment according to an embodiment of the present disclosure.

FIG. 2 is a flowchart of a method for automatically adjusting driver-related in-vehicle equipment according to an embodiment of the present disclosure, and the method includes the steps of:

acquiring the driver's height from the detection device of the vehicle (Step S100);

determining preset values of the additional body parameters of the driver based on the driver's height and calculating a position for entry using the driver's height and the preset values of the additional body parameters of the driver (Step S110); and adjusting the seat to the position for entry so as to facilitate the driver to enter the vehicle and sit on the seat (Step S120).

The method is described in detail below using the example where the detection device 1200 includes the first camera 1210 and the second camera 1220. However, the detection device 1200 can also be configured to acquire directly or indirectly the driver's height and/or the values of the additional body parameters of the driver, as described above.

Figure 3:
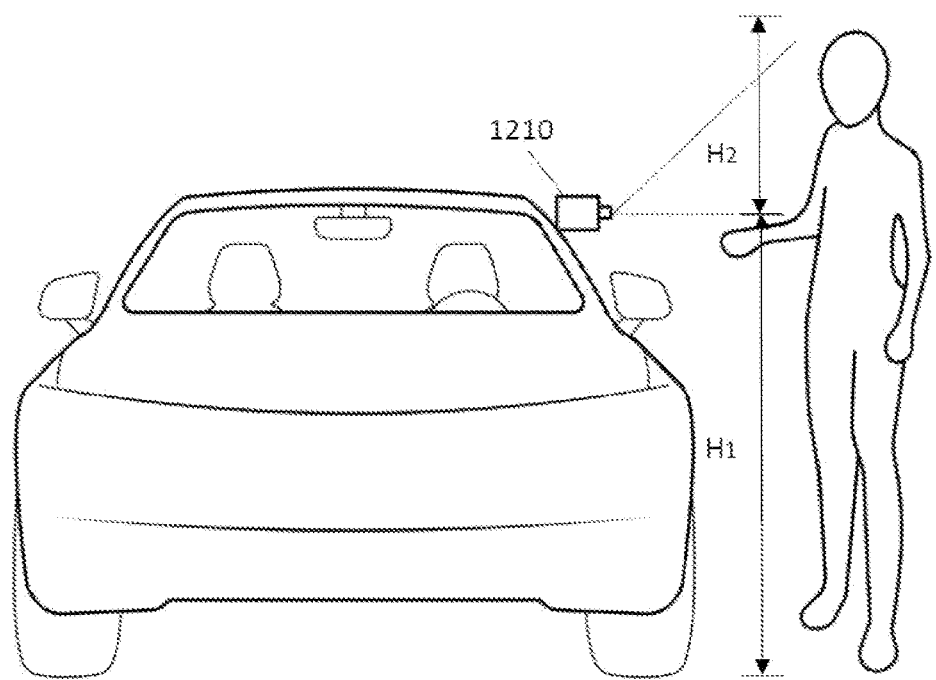
FIG. 3 is a schematic diagram of a first camera of a system for automatically adjusting driver-related in-vehicle equipment taking a picture of a driver according to an embodiment of the present disclosure.

At Step S100, the driver's height is first acquired from the detection device of the vehicle. For example, as shown in FIG. 3, the first camera 1210 is disposed outside the vehicle and configured to capture the first 3D depth image of the driver who is standing outside the vehicle and trying to enter the vehicle. For example, when the driver attempts to open the door or otherwise unlock the door, the first camera 1210 is activated to capture the first 3D depth image of the driver and send the same to the adjustment device 1100.

In an embodiment, when determining the driver's height based on the first 3D depth image, it is known that the first camera's height relative to the vehicle is set to be $H_1$, and an upper body height of the driver exceeding the first camera's height $H_1$ and captured by the first camera is $H_2$, so the driver's height can be calculated by summing the upper body height of the driver $H_2$ and the first camera's height $H_1$:

$$h_{driver}=H_1+H_2 \quad (1)$$

The driver's height $h_{driver}$ can be used to determine the preset values of the additional body parameters of the driver by considering proportionality factors related to the body proportions of the driver. Optionally, in view of current statistics of ergonomic data, the body proportions of the driver can vary depending on the race, gender, and the like of the driver. Taking Asian males as an example, the average body parameters of the Asian males in the 95th percentile are shown in Table 1 below.

TABLE 1

Average Body Parameters of Asian Males

| Body parameters | Representative symbols | Proportionality factors or recommended values |
|---|---|---|
| Standing height | $h_{driver}$ | |
| Head length | $l_{head}$ | $0.145 \times h_{driver}$ |
| Torso length | $l_{upper}$ | $0.361 \times h_{driver}$ |
| Upper arm length | $a_1$ | $0.202 \times h_{driver}$ |
| Forearm length | $a_2$ | $0.169 \times h_{driver}$ |
| Thigh length | $k_1$ | $0.211 \times h_{driver}$ |
| Calf length | $k_2$ | $0.271 \times h_{driver}$ |
| Angle of upper arm relative to forearm | $\alpha$ | 160° |
| Angle of thigh relative to calf | $\beta$ | 110° |
| Angle of upper arm relative to torso | $\delta$ | 50° |

Figure 4:
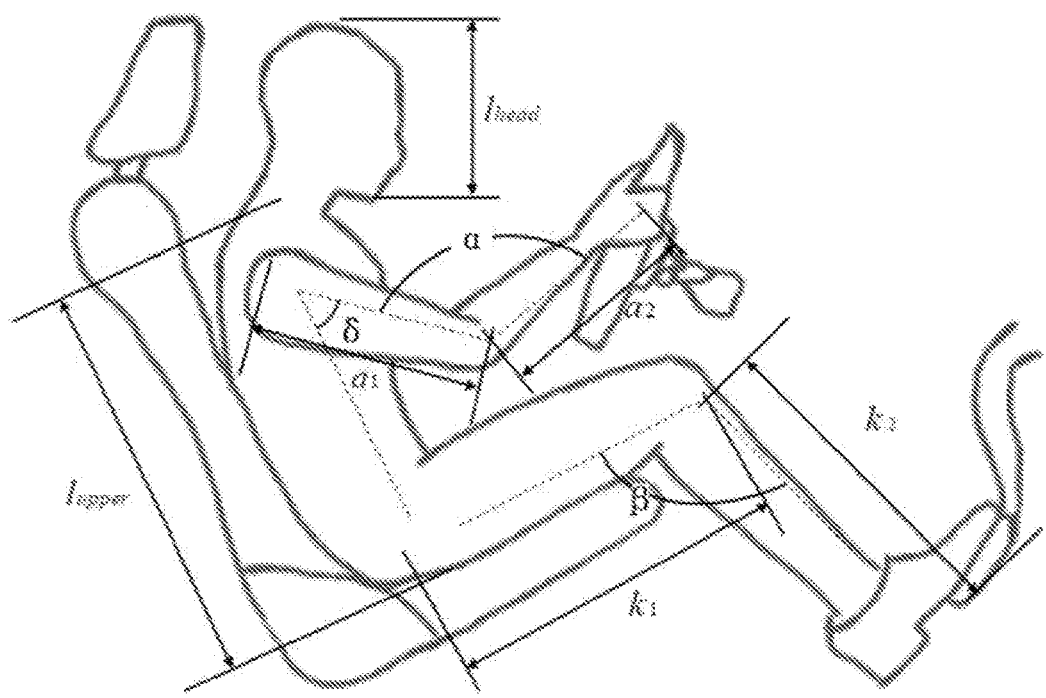
FIG. 4 is a schematic diagram showing body parameters of the driver sitting on a seat.

FIG. 4 is a schematic diagram showing the body parameters of the driver sitting on the seat, in which the relationship between the body parameters of the driver and the adjustment parameters of the seat and the steering wheel is illustrated, and in which values of the angles $\alpha$, $\beta$, and $\delta$ are recommended in advance based on an ergonomic research to minimize the degree of fatigue caused to the driver. As an example, in the present disclosure, the proportionality factors as shown in Table 1 can be used to calculate the preset values of the additional body parameters of the driver. However, each of the proportionality factors of the driver's height used to calculate the corresponding preset value of the additional body parameters of the driver can vary in specific applications.

In one case, the proportionality factors are determined based on the ergonomic data, and each of the preset values of the additional body parameters of the driver is determined by multiplying the driver's height with the corresponding proportionality factor. For example, the additional body parameters of the driver include at least one of the driver's torso length and the driver's head length as shown in Table 1.

The driver's height and the preset values of the additional body parameters of the driver are used to calculate the position for entry by the adjustment device 1100 so as to adjust the seat first for facilitating the driver to enter the vehicle and sit on the seat. In practice, a captured image of the driver that is acquired from the first camera 1210 can be used to determine not only the driver's height but also facial features of the driver for unlocking the vehicle by using the Face Recognition Technology. Further, for adjusting the seat to the position for entry, it is possible to adjust positions and angles of a seat cushion, backrest and headrest. After the driver is seated on the seat, the steering wheel and the rearview mirrors can be further adjusted as described below. Here, the adjustment parameters of the seat and the steering wheel are shown in Table 2.

TABLE 2

Adjustment Parameters of Seat and Steering Wheel

| Adjustment parameters | Representative symbols | Explanations |
|---|---|---|
| Seat height | h' | The height from an intersection point of a seat cushion and a backrest of the seat to the floor of the vehicle |
| Distance to seat | s' | The horizontal distance from the intersection point of the seat cushion and the backrest to the brake pedal of the vehicle |
| Seat inclined angle | γ' | The angle of the seat cushion relative to a horizontal direction |
| Backrest inclined angle | θ' | The angle of the backrest relative to a vertical direction |
| Distance to steering wheel | x' | The horizontal distance from a center of the steering wheel to the brake pedal |
| Steering wheel height | y' | The height from the center of the steering wheel to the floor |
| Headrest inclined angle | φ' | The angle of a headrest relative to the backrest |

Figure 5:
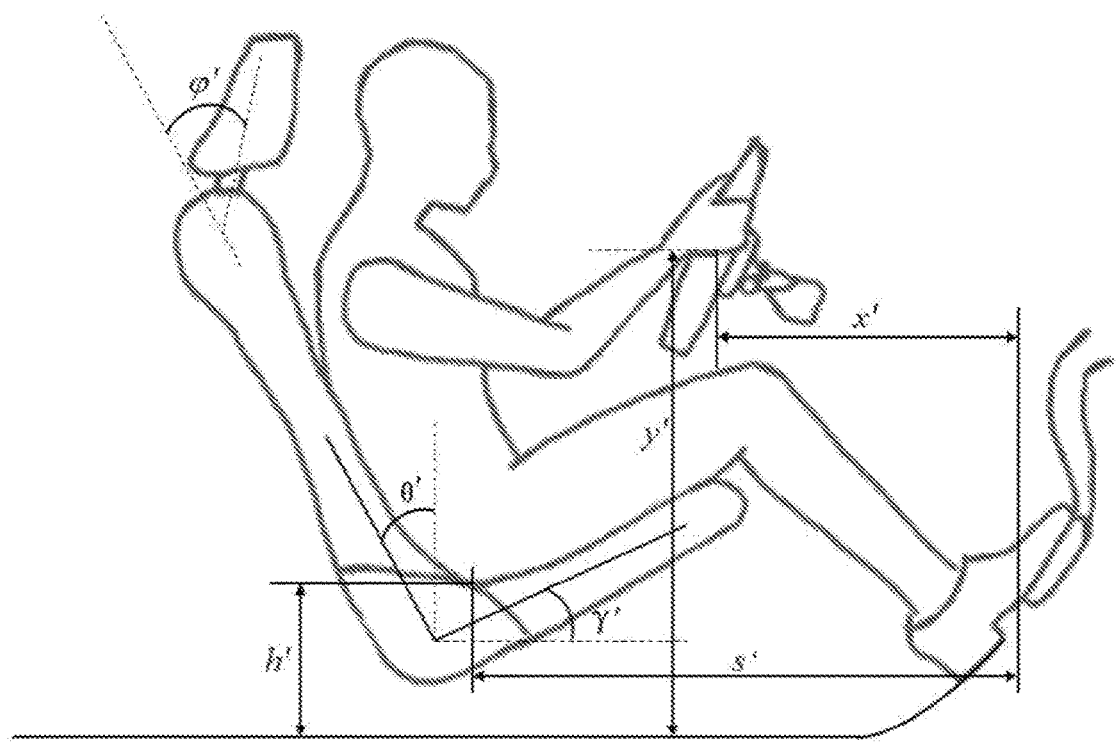
FIG. 5 is a schematic diagram showing adjustment parameters of driver-related in-vehicle equipment when a driver sits on a seat.

FIG. 5 is a schematic diagram showing adjustment parameters of the driver-related in-vehicle equipment when the driver sits on the seat, including the adjustment parameters of the seat and the steering wheel. It can be seen that positions of the seat and the steering wheel in the horizontal and vertical directions are adjustable, and the seat inclined angle γ' is also adjustable.

Additionally, the rearview mirrors, including an interior mirror and side mirrors of the vehicle, are adjustable. The interior mirror can be centrally disposed under the roof and configured to provide the driver with a visual field of a substantially central region behind the driver. The side mirrors are provided at left and right sides of the vehicle and are configured to provide the driver with a visual field of left and right regions adjacent to the vehicle. In particular, the rearview mirrors are adjusted such that the driver of the vehicle can see other vehicles approaching to the vehicle, traveling right behind the vehicle or in an adjacent lane via the rearview mirrors. Optionally, the interior mirror is adjusted such that interiors of the vehicle would not block the visual field, and the side mirrors are adjusted such that the driver can judge the distance from his/her own vehicle to other vehicles or objects visible in the side mirrors. Angles of the rearview mirrors relative to the horizontal and vertical directions are adjusted based on positions of the driver's eyes.

Further, internal dimensions and structural layout of the vehicle can vary depending on its model. When the adjustment device 1100 is applied to the vehicle, inherent parameters of the vehicle to be considered, for example, are shown in Table 3.

TABLE 3

Inherent Parameters of Vehicle

| Inherent parameters | Representative symbols | Explanations |
|---|---|---|
| Brakepedal height | $h_0$ | The height from the brake pedal to the floor of the vehicle when the brake pedal is not pressed |
| Vehicle height | $l_0$ | The height from the roof to the floor of the vehicle |
| Backrest length | $L_0$ | The length from the intersection point of the seat cushion and the backrest to the top of backrest |

Finally, the safety distances from various devices in the vehicle to the driver also need to be considered, to ensure the safety of the driver when entering and driving the vehicle. For example, safety parameters of the vehicle are shown in Table 4, and values of the safety parameters can be preset or recommended based on different models of the vehicle.

TABLE 4

Safety Parameters

| Safety parameters | Representative symbols | Explanations |
|---|---|---|
| Collision avoidance height | $m_0$ | The safety height from the top of the driver's head to the roof to avoid collision of the driver's head in normal driving |
| Visual field safety height | $s_0$ | The height from the driver's eyes (or the top of the driver's head) to the floor of the vehicle which allows the visual field of the driver to meet safety requirements |
| Headrest safety distance | $d_0$ | The safety horizontal distance from the driver's head to the headrest |
| Chest safety distance | $x_0$ | The safety horizontal distance from the driver's chest to the steering wheel |

Table 4 is shown to supplement the adjustment parameters of the seat and the steering wheel in Table 2. The seat height h' is designed to ensure a visual field that satisfies general driving requirements. That is, the positions of the driver's eyes are high enough to see surroundings in front of the vehicle clearly, and the distance from the top of the driver's head to the roof is greater than the collision avoidance height $m_0$ to ensure that the driver's head does not collide with the roof when the vehicle bumps. Further, the driver's sitting posture, for example in terms of the angle β of the driver's thigh relative to the driver's calf and the angle α of the driver's upper arm relative to the driver's forearm, is subject to the seat height. The angle β changes when the driver's foot is stepping on the brake pedal and the angle α changes when the driver's arms are controlling the steering wheel.

The backrest inclined angle θ' is designed to adjust the height of the driver's head in combination with the seat height h' and thereby adjust the positions of the driver's eyes. Further, the angle α is subject to the backrest inclined angle θ' when the driver's arms are steering the steering wheel, and a distance from the driver's chest to the steering wheel is also subject to the backrest inclined angle θ'.

The distance to seat s' is designed such that the driver can put his/her foot on the brake pedals in a comfortable posture. Further, for safety reasons, the distance to seat s' is an important factor in determining the impact of a direct collision of the driver's chest to the steering wheel when an accident occurs.

The seat inclined angle γ' is designed to determine an inclined direction of the seat cushion after the backrest inclined angle θ' and the distance to seat s' are adjusted. It is required that the driver's thighs are completely placed on the seat cushion, i.e., the thighs are placed along the inclined direction of the seat cushion for maximum support.

The distance to steering wheel x' and the steering wheel height y' are designed to be greater than the chest safety distance $x_0$ and can satisfy comfort requirements.

The headrest inclined angle φ' is designed to support the driver's cervical vertebrae in normal driving, relieve fatigue, and protect the driver's cervical vertebrae and the head during an emergency braking. A theoretical value of the headrest inclined angle φ' is designed to be close to the backrest inclined angle θ'. In practice, the headrest inclined angle φ' can be further adjusted based on the shapes of the headrest.

Further, a calculation procedure is described below for calculating, by the adjustment device 1100, the position for entry based on the driver's height and the preset values of the additional body parameters with reference to the various parameters in the above tables.

In one embodiment of the present disclosure, the seat is first adjusted to the position for entry based on the driver's height for the driver to enter the vehicle and then adjusted to a position for driving for the driver to drive the vehicle in a safe manner when the driver is seated on the seat. Compared to the position for driving, the position for entry is designed to be more convenient for the driver to enter the vehicle and sit on the seat. Further, the seat in the position for entry is also designed to have the seat height h', the distance to the seat s', and the like subject to a range of values of the safety parameters. More importantly, the seat can be adjusted from the position for entry to the position for driving quickly after the driver is sitting on it, as a result of which the length of time the driver waits for adjustments of the equipment, such as the seat, is reduced, and user experience is thereby improved.

It should be noted that under the safety regulations of different countries/regions, the backrest inclined angle θ' of the seat is generally fixed at least in safety tests. While the backrest inclined angle θ' provides sufficient support for the cervical vertebrae, the backrest inclined angle θ' can vary without significantly affecting the height of the viewpoint. Therefore, in practice, the backrest inclined angle θ' of the seat can be preset to be 220, for example. Optionally, the value of the headrest inclined angle and the position of the steering wheel, if not adjustable, can be set at the recommended values in advance based on the driver's height.

To ensure the height of the visual field of the driver's eyes and to prevent the driver's head from colliding with the roof in certain situations, the seat height h' is designed to meet the following inequality:

$$s_0 - l_{upper} \times \cos\theta' - l_{head} \leq h' \leq l_0 - m_0 - l_{upper} \times \cos\theta' - l_{head} \quad (2)$$

Based on a combination of the experimentation data and design experience, a regression analysis of the relationship between the seat height h' and the body parameters of the driver (unit: millimeters) is performed. The following empirical formula is provided for calculating a suitable seat height h':

$$h' = A \times h_{driver} - l_{upper} \times \cos\theta' - l_{head} + B \quad (3)$$

where A and B are constants determined based on the model of the vehicle. Different models may correspond to different values for A and B. Other suitable formulas can also be obtained by performing mathematical analysis of the data from experimentation in combination with the design experience with respect to the seat height h' and the body parameters of the driver.

As a result, the seat height h' is determined based on the following:

$$h' = \begin{cases} h' = A \times h_{driver} - l_{upper} \times \cos\theta' - l_{head} + B, \text{ others} \\ s_0 - l_{upper} \times \cos\theta' - l_{head}, \text{ when } h' < s_0 - l_{upper} \times \cos\theta' - l_{head} \\ l_0 - m_0 - l_{upper} \times \cos\theta' - l_{head}, \text{ when } h' > l_0 - m_0 - l_{upper} \times \cos\theta' - l_{head} \end{cases} \quad (4)$$

In accordance with a triangular geometric relationship between the thigh length $k_1$ an the calf length $k_2$ in the body parameters and the adjustment parameters of the seat, a constraint relationship between the seat height h' and the distance to seat s' can be expressed as:

$$(h'-h_0)^2 + s'^2 = k_1^2 + k_2^2 - 2k_1 \times k_2 \cos\beta \quad (5)$$

The seat distance s' is then determined based on the following:

$$s' = \sqrt{k_1^2 + k_2^2 - 2k_1 \times k_2 \cos\beta - (h'-h_0)^2} \quad (6)$$

Similarly, in accordance with another triangular geometric relationship between the thigh length $k_1$ and the calf length $k_2$ in the body parameters and the adjustment parameters of the seat, a constraint relationship between the seat height h' and the seat inclined angle γ' can be expressed as:

$$k_2^2 - (s' - k_1 \times \cos\gamma')^2 = k_1^2 \times \sin^2\gamma' + 2k_1 \times (h'-h_0) \times \sin\gamma' + (h'-h_0 o)^2 \quad (7)$$

The seat inclined angle γ' is then determined based on the following:

$$\gamma' = \arcsin\frac{k_2^2 - k_1^2 - s'^2 - (h'-h_0)^2}{2k_1 \times \sqrt{(h'-h_0)^2 + s'^2}} + \arctan\frac{s'}{h'-h_0} \quad (8)$$

At Step S110, the position for entry is calculated by using the above formulas (4), (6) and (8). The seat height h', the distance to seat s', and/or the seat inclined angle γ' are included as the adjustment parameters of the seat for the position for entry. It should be noted that based on the constraint relationship between the seat height h' and the distance to seat s', when the seat height h' is lower, i.e. the seat is closer to the vehicle floor, the seat distance s' is longer, i.e. the seat is further away from the brake pedal. It is easier for the driver to enter the vehicle as the seat is more backward and lowered. However, to quickly adjust the seat from the position for entry to the position for driving as the driver is seated on the seat, the position for entry is required to be properly designed, rather than completely lowering the seat to the lowest and most backward position. Therefore, the proportionality factors between the driver's height and the preset values of the additional body parameters of the driver determined based on the ergonomic data can be adjusted, such that the position for entry is more likely to be lower than and backward relative to the position for driving. As the seat is adjusted from the position for entry to the position for driving, the seat is lifted and pushed forward. For example, when the driver's torso length or the driver's head length is to be calculated based on the driver's height, the corresponding proportionality factor obtained from the ergonomic data is selectively used or adjusted within a reasonable range based on empirical formulas so as to "extend" the driver's torso length $l_{upper}$ and/or the driver's head length $l_{head}$. As a result, the calculated position for entry is lower and more backward than the position for driving, facilitating the driver to enter the vehicle and sit on the seat easily.

Figure 6:
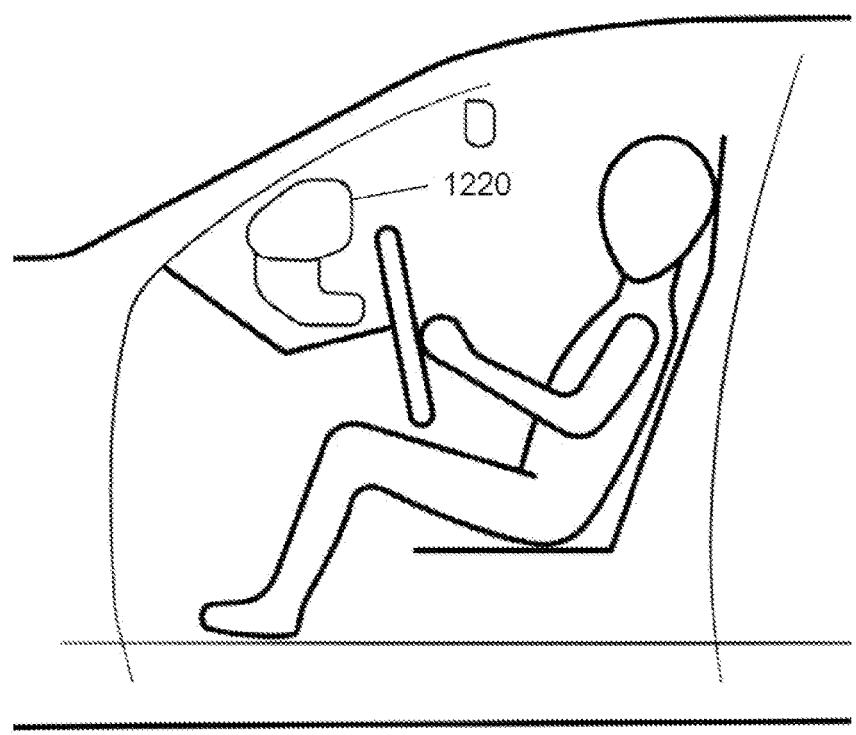
FIG. 6 is a schematic diagram of a second camera of a system for automatically adjusting driver-related in-vehicle equipment taking a picture of a driver according to an embodiment of the present disclosure.

After Step S120, updated values of the additional body parameters of the driver can be obtained by the detection device of the vehicle. FIG. 6 is a schematic diagram of the second camera 1220 of the detection device 1200 taking a picture of the driver according to an embodiment of the present disclosure. In an embodiment, the second camera 1220 is configured to capture the second 3D depth image of the driver sitting on the seat. The second camera 1220 can be configured to be activated by itself to detect the driver sitting on the seat. Additionally or alternatively, a separate sensor, such as a pressure sensor, can be provided to determine when the driver has been seated on the seat. When the driver starts to observe the dashboard and/or wear a seat belt, the second camera 1220 would start to capture the second 3D depth image of the driver and send the same to the adjustment device 1100. The adjustment device 1100 is configured to determine, based on the second 3D depth image at the time, the updated values of the additional body parameters of the driver, for example the driver's torso length $l_{upper}$ and/or the driver's head length $l_{head}$, and optionally the driver's upper arm length $a_1$ and the driver's forearm $a_2$ length, and especially the angle $\alpha$ of the driver's upper arm relative to the driver's forearm, and the angle $\delta$ of the driver's upper arm relative to the driver's torso in the case where the driver puts his hands on the steering wheel appropriately (for example, both hands are put on the steering wheel at directions of three o'clock and nine o'clock respectively). Positions and angles for the seat and positions for the steering wheel are adjusted once again based on these updated adjustment parameters.

As can be seen, the calculation procedure for calculating the position for entry can also be used for calculating the position for driving. In the meanwhile, the updated values of the additional body parameters, such as the driver's torso length $l_{upper}$ and/or the driver's head length $l_{head}$ are closer to the actual measurement of the driver's body parts, and a formula as below can be used to correct or verify the driver's thigh length $k_1$ and the driver's calf length $k_2$:

$$\begin{cases} k'_1 + k'_2 + l'_{upper} + l'_{head} = h_{driver} \\ \dfrac{k'_1}{k'_2} = \dfrac{0.211}{0.271} \end{cases} \qquad (9)$$

The seat is adjusted from the position for entry to the position for driving which is calculated in a simple and accurate way using the formulas (4), (6), (8) and (9). For clarity, the preset values of the additional body parameters, such as the driver's torso length $l_{upper}$, the driver's head length $l_{head}$, the driver's thigh length $k_1$ and the driver's calf length $k_2$ are determined with reference to the corresponding proportionality factor obtained from the ergonomic data before the driver enters the vehicle, while the updated values of the additional body parameters of the driver, such as, the driver's torso $l'_{upper}$, the driver's head $l'_{head}$, the driver's thigh length $k'_1$, and the driver's calf length $k'_2$ are acquired from the second camera 1220 when the driver is seated on the seat. Further, to make use of the position for entry and the position for driving efficiently, the proportionality factors are adjusted based on the updated values of the additional body parameter, for example being enlarged, such that the preset values of the additional body parameters are each to be greater than the corresponding updated value of the additional body parameter. In other words, the adjusted proportionality factors are each derived from but adjusted to be greater than a corresponding original proportionality factor obtained from the ergonomic data.

In addition to calculating the position for driving, the updated values of the additional body parameters are also used to correct or verify the preset values of the additional body parameters in combination with the driver's height so as to optimize the accuracy of the detection device.

Additionally, according to the design requirements of the headrest inclined angle $\varphi'$, the headrest safety distance $d_0$ is set to protect the driver's head and cervical vertebrae in certain situations. Thus, the distance from the driver's head to the headrest has to be shorter than the headrest safety distance $d_0$:

$$(L_0-l_{upper})\times\sin\theta'-[l_{head}-(L_0-l_{upper})\times\cos\theta']\times\sin(\text{'}-\theta')\le d_0 \qquad (10)$$

For example, the distance from the driver's head to the headrest can be set as a median value of the headrest safety distance $d_0$, so the headrest inclined angle $\varphi'$ is expressed as:

$$\varphi' = \arcsin\left[\dfrac{(L_0 - l_{upper})\times\sin\theta' - \dfrac{1}{2}d_0}{l_{head} - (L_0 - l_{upper})\times\cos\theta'}\right] + \theta' \qquad (11)$$

The headrest inclined angle $\varphi'$ can also be considered as an adjustment parameter of the position for driving.

In another embodiment, when adjusting the adjustment parameters of the seat, other driver-related in-vehicle equipment, such as the steering wheel and the rearview mirrors, can also be adjusted. As such, positions and angles of the steering wheel and the rearview mirrors can be optimized to provide the driver with a safe and comfortable driving condition.

As to the steering wheel, a constraint relationship between the steering wheel distance $x'$ and the distance to seat $s'$ can be expressed as below with reference to a linear geometric relationship between the driver's torso length $l_{upper}$, the angle $\alpha$ of the driver's upper arm relative to the driver's forearm, the angle $\delta$ of the driver's upper arm relative to the driver's torso and the adjustment parameters of the seat:

$$x'=s'+l_{upper}\times\sin\theta'-a_1\times\sin(\delta+\theta')-a_2\times\sin(\alpha-\delta-\theta') \qquad (12)$$

A constraint relationship between the steering wheel height $y'$ and the distance to seat $s'$ is expressed as:

$$y'=h'+l_{upper}\times\cos\theta'+a_2\times\cos(\alpha-\delta-\theta')-a_1\times\cos(\delta+\theta') \qquad (13)$$

The horizontal distance from the driver's chest to the steering wheel is set to be greater than or equal to the chest safety distance $x_0$:

$$s'-x'+l_{upper}\times\sin\theta'\ge x_0 \qquad (14)$$

Thus, the steering wheel distance $x'$ is expressed as:

$$x' = \begin{cases} s' + l_{upper}\times\sin\theta' - a_1\times\sin(\delta+\theta') - a_2\times\sin(\alpha-\delta-\theta'), & \text{others} \\ s' + l_{upper}\times\sin\theta' - x_0, & \text{when } x' > s' + l_{upper}\times\sin\theta' - x_0 \end{cases} \qquad (15)$$

A steering position of the steering wheel can be calculated by the formulas (13) and (15) in a simple and accurate manner, and the steering wheel can be adjusted based on the steering position so as to optimize the driver's arm posture for steering the steering wheel. Such arm posture can minimize the degree of fatigue caused to the driver based on the ergonomic research.

The steering wheel can be adjusted while the driver is sitting on the seat. Additionally or alternatively, the steering wheel can also be adjusted before the driver enters the vehicle. In an embodiment, the preset values of the additional body parameters of the driver, such as the driver's forearm length $a_1$ and the driver's upper arm length $a_2$, as well as the adjustment parameters of the steering wheel, such as the steering wheel distance x', are estimated based on the driver's height before the driver enters the vehicle. If the estimated steering wheel distance x' is longer than the current steering wheel distance, the steering wheel can be further adjusted when the driver is seated on the seat. If the estimated steering wheel distance x' is shorter than the current steering wheel distance, the steering wheel can be adjusted in advance while the driver is entering the vehicle.

Additionally, after the seat and/or steering wheel are adjusted, the positions of the driver's eyes are determined based on the second 3D depth image of the driver obtained by the second camera 1220. Using known techniques such as analysis of experimentation data and design experience, the optimized angles of the rearview mirrors can be determined based on the positions of the driver's eyes to ensure that the visual field of the driver covers surroundings around the vehicle. Each of the rearview mirrors can be then adjusted to the corresponding optimized angle so as to optimize the visual field of the driver for viewing the surroundings around the vehicle.

The present disclosure can be embodied as a system, a method and/or a computer program product which includes a computer-readable storage medium loaded with computer-readable programmed instructions for enabling a processor to implement various aspects of the present disclosure.

Although some specific embodiments of the present disclosure have been demonstrated in detail with examples, it should be understood by those skilled in the art that the above examples are only intended to be illustrative but not to limit the scope of the present disclosure and the above embodiments could be modified without departing from the scope and spirit of the present disclosure.

The invention claimed is:

1. A method for automatically adjusting driver-related in-vehicle equipment, the method comprising the steps of:
  acquiring a height of a driver from a first detection device of a vehicle;
  determining preset values of additional body parameters of the driver based on the driver's height and calculating a position for entry using the driver's height and the preset values of the additional body parameters of the driver;
  adjusting the equipment comprising a driver's seat to the position for entry so as to facilitate the driver to enter the vehicle and sit on the seat;
  acquiring updated values of the additional body parameters of the driver sitting on the seat from a second detection device of the vehicle and calculating a position for driving using the driver's height and the updated values of the additional body parameters of the driver; and
  adjusting the seat from the position for entry to the position for driving so as to optimize a driving posture of the driver sitting on the seat,
  wherein the step of determining preset values of additional body parameters of the driver based on the driver's height comprises:
    determining each of the preset values of the additional body parameters of the driver by multiplying the driver's height with a corresponding first proportionality factor, each corresponding first proportionality factor being derived from and greater than a corresponding second proportionality factor that is obtained from ergonomic data for representing a physical proportion of each of the additional body parameters of the driver to the driver's height, such that each of the preset values of the additional body parameters of the driver is greater than the corresponding updated value of the additional body parameters of the driver, and
  wherein the additional body parameters of the driver comprises the driver's torso length and the driver's head length, and both in the step of calculating a position for entry and in the step of calculating a position for driving, a formula below is used to calculate a height from an intersection point of a seat cushion and a backrest to a floor of the vehicle as a first adjustment parameter for the position for entry and a first adjustment parameter for the position for driving:

$$h' = \begin{cases} h' = A \times h_{driver} - l_{upper} \times \cos\theta' - l_{head} + B, \text{others} \\ s_0 - l_{upper} \times \cos\theta' - l_{head}, \text{when } h' < s_0 - l_{upper} \times \cos\theta' - l_{head} \\ l_0 - m_0 - l_{upper} \times \cos\theta' - l_{head}, \text{when } h' > l_0 - m_0 - l_{upper} \times \cos\theta' - l_{head} \end{cases}$$

where h' represents the height from the intersection point of the seat cushion and the backrest to the floor of the vehicle,
A and B represent numerical constants,
$h_{driver}$ represents the driver's height acquired from the first detection device,
$l_{upper}$ represents the preset value of the driver's torso length in the step of calculating a position for entry, and the updated value of the driver's torso length in the step of calculating a position for driving,
$l_{head}$ represents the preset value of the driver's head length in the step of calculating a position for entry, and the updated value of the driver's head length in the step of calculating a position for driving,
θ' represents an fixed angle of the backrest relative to a vertical direction, $s_0$ represents a height from the driver's eyes to the floor which allows a visual field of the driver to meet safety requirements, $m_0$ represents a safety height from the top of the driver's head to a roof of the vehicle which is required for preventing the driver's head from colliding with the roof in normal driving, and
$l_0$ represents a height from the roof to the floor.

2. The method according to claim 1, wherein the step of acquiring the height of the driver situated outside the vehicle from the first detection device of the vehicle comprises the steps of:
  acquiring a first 3D depth image of the driver from a first camera configured as the first detection device; and
  determining the driver's height based on the first 3D depth image.

3. The method according to claim 2, wherein the step of determining the driver's height based on the first 3D depth image comprises determining an upper body height of the driver that exceeds the first camera's height based on the first 3D depth image and summing the upper body height of the driver and the first camera's height.

4. The method according to claim 1, wherein A and B are obtained by performing regression analysis of data from experimentation and design experience.

5. The method according to claim 1, wherein the step of acquiring updated values of the additional body parameters of the driver sitting on the seat from the second detection device of the vehicle comprises the steps of:
- acquiring a second 3D depth image of the driver sitting on the seat by a second camera configured as the second detection device, and
- determining the updated values of the additional body parameters of the driver based on the second 3D depth image.

6. The method according to claim 1, wherein the position for entry is configured to be lower than and backward relative to the position for driving.

7. The method according to claim 1, wherein the additional body parameters of the driver further comprise the driver's thigh length and the driver's calf length, and both in the step of calculating the position for entry and in the step of calculating the position for driving, a formula below is used to calculate a horizontal distance from the intersection point of the seat cushion and the backrest to a brake pedal of the vehicle as a second adjustment parameter for the position for entry and a second adjustment parameter for the position for driving:

$$s' = \sqrt{k_1^2 + k_2^2 - 2k_1 \times k_2 \cos\beta - (h' - h_0)^2}$$

where s' represents the horizontal distance from the intersection point of the seat cushion and the backrest to the brake pedal of the vehicle,
$k_1$ represents a present value of the driver's thigh length in the step of calculating the position for entry, and the updated value of the driver's thigh length in the step of calculating the position for driving,
$k_2$ represents a preset value of the driver's calf length in the step of calculating the position for entry, and the updated value of the driver's calf length in the step of calculating the position for driving,
β represents a recommended angle of the driver's thigh relative to the driver's calf, and
$h_0$ represents a height from the brake pedal to the floor when the brake pedal is not pressed.

8. The method according to claim 7, wherein both in the step of calculating the position for entry and in the step of calculating the position for driving, a formula below is used to calculate an angle of the seat cushion relative to a horizontal direction as a third adjustment parameter for the position for entry and a third adjustment parameter for the position for driving:

$$\gamma' = \arcsin\frac{k_2^2 - k_1^2 - s'^2 - (h' - h_0)^2}{2k_1 \times \sqrt{(h' - h_0)^2 + s'^2}} + \arctan\frac{s'}{h' - h_0}$$

where γ' represents the angle of the seat cushion relative to the horizontal direction.

9. The method according to claim 8, wherein both in the step of calculating the position for entry and in the step of calculating the position for driving, a formula below is used to calculate an angle of a headrest of the seat relative to the backrest as a forth adjustment parameter for the position for entry and a forth adjustment parameter for the position for driving:

$$\varphi' = \arcsin\left[\frac{(L_0 - l_{upper}) \times \sin\theta' - \frac{1}{2}d_0}{l_{head} - (L_0 - l_{upper}) \times \cos\theta'}\right] + \theta'$$

where φ' represents the angle of the headrest of the seat relative to the backrest, $L_0$ represents the backrest's length, and $d_0$ represents a horizontal safety distance from the driver's head to the headrest.

10. The method according to claim 1, wherein the equipment further comprises a steering wheel and the method further comprises the steps of:
- calculating a steering position of the steering wheel for steering the steering wheel using the driver's height and the updated values of the additional body parameters of the driver; and
- adjusting the steering wheel to the steering position;
- and wherein in the step of calculating the steering position of the steering wheel for steering the steering wheel, formulas below are used to calculate a horizontal distance from a center of the steering wheel to a brake pedal of the vehicle and a height from the center of the steering wheel to a floor of the vehicle as adjustment parameters for the steering position of the steering wheel:

$$x' = \begin{cases} s' + l_{upper} \times \sin\theta' - a_1 \times \sin(\delta + \theta') - a_2 \times \sin(\alpha - \delta - \theta'), & \text{others} \\ s' + l_{upper} \times \sin\theta' - x_0, & \text{when } x' > s' + l_{upper} \times \sin\theta' - x_0 \end{cases} \text{ and}$$

$$y' = h' + l_{upper} \times \cos\theta' + a_2 \times \cos(\alpha - \delta - \theta') - a_1 \times \cos(\delta + \theta')$$

where x' represents the horizontal distance from the center of the steering wheel to the brake pedal of the vehicle,
y' represents the height from the center of the steering wheel to the floor of the vehicle,
s' represents a horizontal distance from an intersection point of a seat cushion and a backrest of the vehicle to the brake pedal acquired in the step of calculating the position for driving,
$L_{upper}$ represents an updated value of the driver's torso length,
θ' represents a fixed angle of the backrest relative to a vertical direction,
$a_1$ represents the driver's upper arm length acquired from the second detection device,
$a_2$ represents the driver's forearm length acquired from the second detection device,
δ represents an angle of the driver's upper arm relative to the driver's torso acquired from the second detection device,
α represents an angle of the driver's upper arm relative to the driver's forearm acquired from the second detection device, and
h' represents a height from the intersection point of the seat cushion and the backrest to the floor acquired in the step of calculating the position for driving.

11. The method according to claim 1, wherein the equipment further comprises a rearview mirror and the method further comprises the steps of:
- acquiring positions of the driver's eyes from the second detection device of the vehicle; determining an optimized angle of the rearview mirror based on the positions of the driver's eyes; and
- adjusting the rearview mirror to the optimized angle so as to optimize the driver's visual field for viewing surroundings around the vehicle.

12. An adjustment device for automatically adjusting driver-related in-vehicle equipment, the adjustment device comprising:

a processor; and a memory configured to store executable instructions that, when executed by the processor, cause the processor to perform the method according to claim 1.

13. A system for automatically adjusting driver-related in-vehicle equipment, the system comprising:

the adjustment device according to claim 12;

the first detection device disposed outside the vehicle and configured to detect the height of the driver situated outside the vehicle; and the second detection device disposed within the vehicle and configured to detect updated values of the additional body parameters of the driver sitting on the seat.

14. The system according to claim 13, wherein the first detection device is configured as a first camera disposed outside the vehicle and configured to capture a first 3D depth image of the driver situated outside the vehicle and send the same to the adjustment device; and the second detection device is configured as a second camera disposed within the vehicle and configured to capture a second 3D depth image of the driver sitting on the seat and send the same to the adjustment device.

\* \* \* \* \*